Oct. 21, 1969 R. C. HERGENROTHER 3,474,286

IMAGE ORTHICON INTEGRATOR DEVICE FOR AN ELECTRO-OPTICAL CORRELATION SYSTEM

Filed Jan. 3, 1968 2 Sheets-Sheet 1

INVENTOR
RUDOLF C. HERGENROTHER

BY Edgar O. Rost

ATTORNEY

INVENTOR
RUDOLF C. HERGENROTHER
BY Edgar O. Rost
ATTORNEY 3,474,286

IMAGE ORTHICON INTEGRATOR DEVICE FOR AN ELECTRO-OPTICAL CORRELATION SYSTEM

Rudolf C. Hergenrother, West Newton, Mass., assignor to Raytheon Company, Lexington, Mass., a corporation of Delaware Filed Jan. 3, 1968, Ser. No. 695,433
Int. Cl. H01j *31/26, 29/41;* H04b *9/00*
U.S. Cl. 315—12 6 Claims

ABSTRACT OF THE DISCLOSURE

An electron discharge device of the image orthicon type having an electron image section and a signal multiplier section is modified by the provision of a biased grid control member disposed within the electron image section adjacent to and parallel with the semitransparent photocathode to provide for the integration and processing of time variable signals in the exercise of electro-optical correlation techniques.

BACKGROUND OF THE INVENTION

In the electronic communications art the employment of electro-optical techniques in the processing of information signals provides for the emergence of modulated light patterns varying in time in accordance with the parameters of transparent solid state delay lines. One signal input in accordance with known correlation techniques is coupled to the delay line to provide for the modulation of a light beam. Electrical signals are thereby converted by the elastic waves within the solid state material and in the cross correlation concept these signals are electrically multiplied by a second signal which provides a replica of the transmitted signal and the resultant product is integrated. For the purpose of this specification the term "cross correlation" shall be interpreted to refer to the multiplication of two functions in the processing of intelligence signals, namely the integration and readout by electrical means of the signal wave forms. Electro-optical integrator devices, particularly such devices employing the cross correlation techniques, are utilized in the processing of radar signal information to obtain higher resolution in target definition and location as well as aerial reconnaisance and mapping of geographical areas utilizing radio frequency energy. A solid delay line such as quartz which is transparent and ultrasonically birefringent provides, through transducer means, for the conversion of electrical signals into ultrasonic elastic waves within the delay line to modulate the uniform light pattern emerging from a constant intensity source. Such delay line structures are conventionally sandwiched between crossed light polarizers and analyzers after traversing a lens which collimates the incident light. The emergent ultrasonically modulated light beam is processed and integrated by electronic scanning devices of the type incorporating a photosensitive cathode together with means for the multiplication and integration of the input signals utilizing secondary electron emission characteristics as well as electron charge storage to result in highly resolved output correlation signals.

A photoelectric conversion device of interest in the television camera art is the image orthicon tube providing within an evacuated envelope a photocathode which converts the incident optical image to an electron discharge image and means for the processing of the electron image signals impinging upon a storage target which may be read by means of an electronic scanning beam disposed on the reverse side of the target member. Focusing and scanning coils together with appropriate signal generation means provide for the scanning operation.

Prior art attempts to adapt image orthicon type devices as an integrator tube for use in electro-optical correlation systems have resulted in operation of the storage target close to its critical voltage or first crossover voltage to reduce the charge produced by noncorrelated signals. Operation at this critical voltage is unstable and therefore unsuccessful. Operation at voltages slightly above the critical voltage results in accumulation of positive charges from uncorrelated signals which drastically reduce the usable dynamic range and requires a periodic discharging cycle. In addition modulation of the electron beam velocity produces drastic disturbances of the electron optical system focus. A need exists, therefore, to provide in an electro-optical cross correlation signal processing system an improved photoelectric translation means to integrate optical signals and provide a high resolution rate.

SUMMARY OF THE INVENTION

In accordance with the teachings of the present invention an image orthicon device is provided having a signal grid control member disposed adjacent to the photocathode in the electron image section of the over-all device. The target mesh screen member disposed adjacent to the storage target electrode at the opposing end of the electron image section is allowed to perform its conventional function of collecting secondary electrons to serve as a signal plate in determining the capacitance of the storage target electrode. The input signal in this application is utilized now to modulate the grid control member disposed adjacent to the photocathode to thereby directly modulate the photoemission current within the electron image section of the over-all tube. Relatively small modulating signal voltages are required to produce modulation of the photoelectrons reaching the target electrode. The proposed implementation of the present invention will produce an accumulated positive charge on the target during its integration period and in a disclosed system, the readout beam of the electron gun of the orthicon device is operative during the writing operation and by suitable adjustment of the beam current and beam energy an accumulation of negative charge is placed on the reading side of the target at the same rate as the accumulation of positive background charge occurs during the writing operation. The target electrode operates at a high secondary emission ratio so that the light transfer characteristics and signal-to-noise ratio are of the same order as is utilized in television camera operations to thereby provide extremely high resolution power in the processing of radiant energy signals by electro-optical techniques utilizing cross correlation. A number of heretofore insurmountable difficulties utilizing image orthicon type tubes in electro-optical correlation systems for integration of signals is believed to be substantially reduced by permitting the operation of the target mesh screen and target electrode with the normal operating voltages and permitting the modulation of the photoelectrons emitted by the photocathode to be controlled at the source adjacent to the photocathode surfaces.

Several alternative circuits for the correlation of the readout and writing functions and control of the beam current and beam energy parameters during operation of the integrator tube are also disclosed in the following specification.

BRIEF DESCRIPTION OF THE DRAWINGS

The invention, as well as the specific details of the construction of an illustrative embodiment, will now be described, reference being directed to the accompanying drawings, in which.

DESCRIPTION OF THE PREFERRED EMBODIMENT

Figures 1, 2:
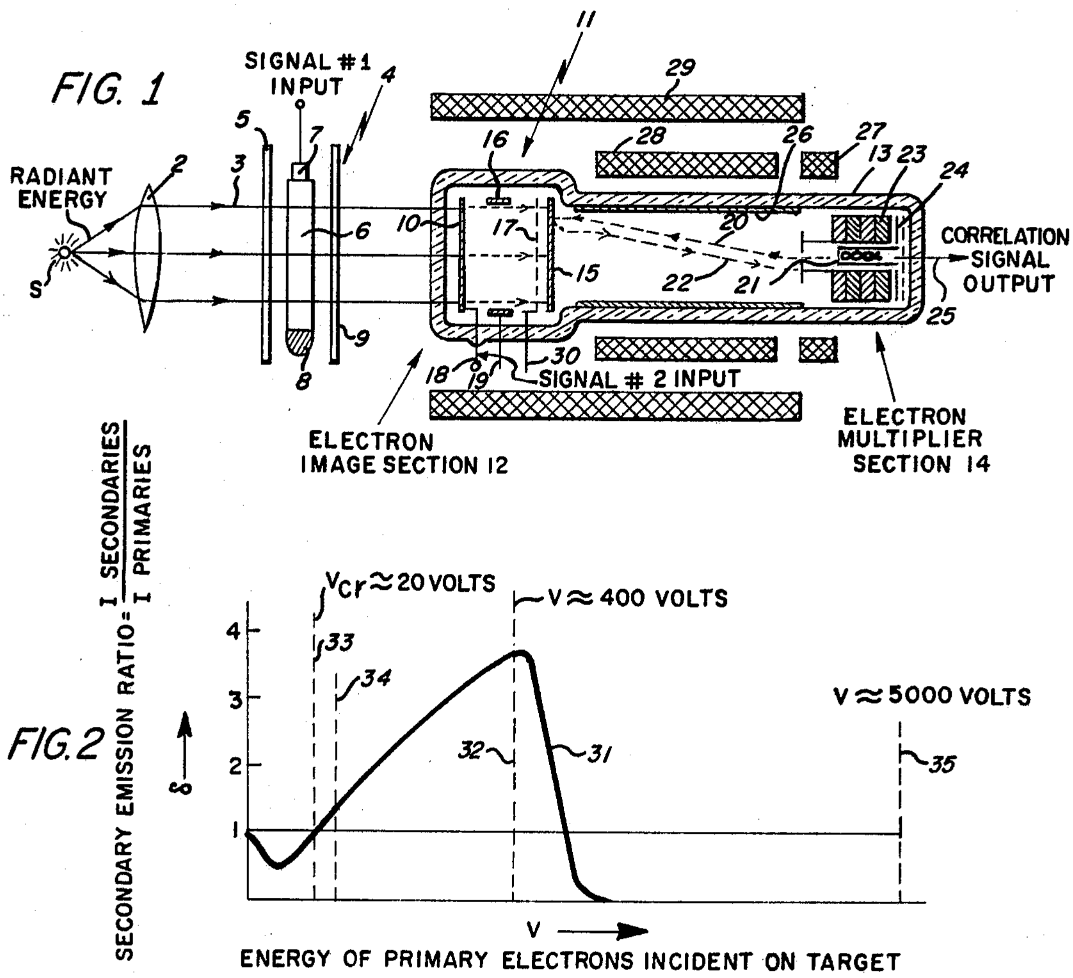
FIG. 1 is a schematic diagram of an electro-optical correlator system incorporating a prior art image orthicon device.
FIG. 2 is a plot diagram illustrative of the secondary emission characteristics of interest in the electron image section of an applicable image orthicon device.

Refering now to the drawings, FIG. 1 illustrates an electro-optical processing system together with a prior art image orthicon type device. In this embodiment intense radiant energy emanating from a source S is directed by means of lens 2 to form a collimated beam 3 through an optical delay line modulator 4. The radiant energy beam is focused through a light polarizer 5 onto a solid state transparent optical delay line 6, preferably of a material such as fused quartz capable of supporting elastic waves upon stimulation by electrical signals. The delay line element 6 comprises an input end supporting a transducer 7 of the piezoelectric type for the application of an input signal from an external source. The opposing end of the optical delay line 6 is provided with a sonic energy absorber 8 to prevent the generation of undesirable reflections of the acoustic energy. A second light responsive means follows the optical delay line and comprises an analyzer or crossed polarizer 9 which provides for the variation of the intensity of the light signals sinusoidally with the amplitude of the wave forms present in the optical delay line 6 responsive to the electrical signals coupled thereto by the transducer 7. The emergent modulated light beam impinges upon a photoconductive cathode 10 of an image orthicon type tube 11 which provides by electrical translating means the integration and readout function by electronic scanning.

Image orthicon tube 11 broadly comprises a first section which is designated as the electron image section 12 at one end of a transparent envelope 13 with the opposing end of the envelope housing the electron multiplier section 14.

The electron image section 12 includes a storage target member 15 whose surface provides a secondary electron emission ratio substantially higher than unity. The light rays transmitted by the optical modulator 4 cause the photocathode 10 to emit photoelectrons which, when impinging upon the storage target member 15, result in the generation of a profusion of secondary electrons. An anode ring electrode 16 in combination with the magnetic field produced by focussing coil 29 is utilized to focus electrons leaving a point on the photocathode to a corresponding point on the storage target. A fine target mesh screen 17 is disposed in front of the storage target member 15 and in conventional well known image orthicon type tubes the target screen collects the secondary electrons released by the storage target. A charge is thus stored on the storage target which may become a few volts more positive than the adjacent target mesh in the areas receiving electrons from strongly illuminated areas of the photocathode. The photocathode is conventionally biased at a high negative voltage coupled to lead 18 while the anode ring 16 is coupled to the positive voltage source by means of lead 19. Lead 30 coupled to the target mesh screen is biased near ground potential.

The electron multiplier section 14 comprises a relatively low velocity electron scanning beam 20 generated by a reading gun assembly 21 of well known construction. The beam 20 scans the reverse side of the storage target member 15 and deposits electrons in the areas corresponding to the positive charged areas of the electron image. The returning beam of electrons 22 will contact the anode member of the reading gun to be scattered, deflected and collected by the plurality of multiplying dynode electrodes 23 including collecting electrode 24 for coupling the output signals by means of lead 25 to the external circuit. The return beam signal modulation or readout signal is utilized in the cross correlation of signals in accordance with the system of the present invention.

A conductive coating 26 on the interior walls of the transparent envelope 13 is conventionally coupled to the high accelerating anode voltage used in the reading gun for internally focusing the electrons. An external alignment coil 27 is used to align the beam initially and is of well known construction. A deflecting magnetic coil 28 and a focusing magnetic coil 29 are similarly externally disposed and through biasing in a conventional manner utilizing sawtooth voltage generators the focusing and scanning functions with appropriate frequencies and variable voltages are supplied. The electrons in the electron beam neutralize the positive charges with more positive parts of the scanned target requiring a greater number of electrons during the readout operation. The more positive parts of the scanned target or what was initially the brighter areas of the optical image will require the greater number of electrons than the darker areas. The return or readout beam modulation therefore will be the difference between the uniform current arriving at the target from the reading beam and the current abstracted by this charging process resulting in a negative image relating to the optical image at the photocathode.

In earlier attempts to use the image orthicon tube as an electro-optical correlator the input signal was coupled to the photocathode 10 by means of lead 18. This electrical signal could be a replica of the transmitted radar signal pulses which, when combined with the optically delayed returning signals, was expected to provide the integration and correlation required. Referring now to FIG. 2, the problems inherent in the modulation of the photocathode potential for providing the second input modulation will be described. In this illustration the secondary emission ratio coefficient $\delta$ of the target member is plotted along one axis as a function of the energy of the primary photoelectrons incident upon the target. The curve 31 indicates a normal range of operation of an image orthicon tube when utilized as a camera tube having a primary beam energy of approximately 400 volts as indicated by the dotted line 32 providing a substantial secondary emission ratio. In view of the operational requirement for the primary electron beam energy to have a value relative to the secondary emission ratio requirement of the target member as being greater than unity to stimulate secondary emission the minimum point for successful operation is indicated by the dotted line 33 and a value of approximately 20 volts. This point in the operation mode where the secondary emission ratio is unity is referred to as the crossover potential. A considerable number of difficulties were encountered by experimenters who attempted to operate at these low voltage values. They observed, for example, that aberrations of focus and redistribution of the charge from the target member by returned secondary electrons became very critical when the energy with which the primary photoelectrons impinged upon the target was reduced further by reason of the application of the signal No. 2 input to the photocathode. Velocity modulation of the photoemission current by the input electrical signal therefore reduced resolving power by more than an order of magnitude from that when the tube is operated for its destined purpose as a television camera tube. Another serious problem encountered in the operation of this device for cross correlation purposes was that the rate of charging of the target was observed to be proportional to the net current flow, which may be defined as the difference between primary and secondary currents. At the crossover point this net current is exactly zero and at a beam voltage only slightly on either side of this crossover point the charge builds up, either decreasing or increasing, at an exponential rate. The critical or crossover voltage therefore was observed to be the point of unstable equilibrium. Attempts to operate the image orthicon tube at this critical target potential point were unsuccessful and served to demonstrate an apparent lack of uniformity of target secondary emission characteristics.

An operative prior art tube having a primary electron beam value is indicated by the dotted line 34. Operation at a value of slightly over the crossover value of beam energy of 20 volts did indicate that the correlation phenomena characteristics desired in cross correlation systems could be attained utilizing image orthicon tubes. During the operation of this experimental embodiment, however, it was observed that in addition to bad focus distortions this slightly higher than critical voltage operation mode was accompanied by a background charge accumulation on the target member which drastically reduced the usable dynamic range and lowered the signal-to-noise ratio.

The next critical or crossover beam energy point which offers a second possible operation mode is indicated by the dotted line 35 and has been calculated to require a beam potential of approximately 5,000 volts. In principle, operation at this second voltage point should result in a stable equilibrium condition of the target potential pattern to enhance the resolution factor. The primary disadvantage of operation at this critical voltage is the exceedingly high electron beam energy required as well as the inherent shallow slope configuration at this point which can only result in somewhat lower sensitivity. Experimental attempts, however, to operate at such high voltage value have not met with success.

Figure 3:
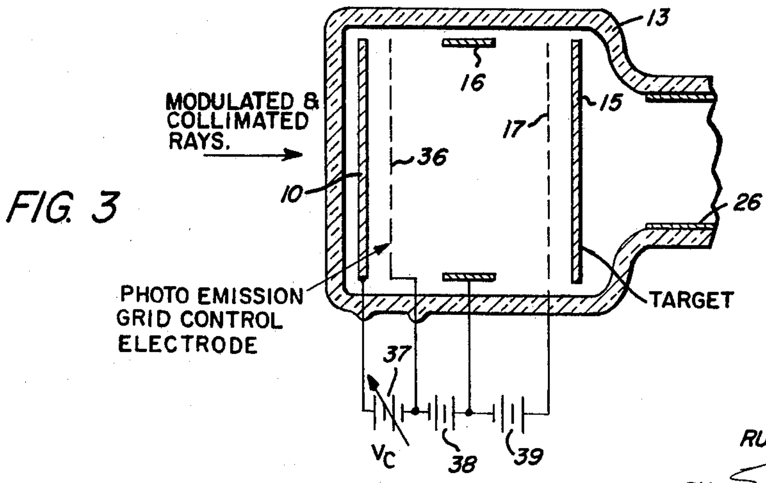
FIG. 3 is a schematic diagram of the electron image section of an illustrative embodiment of the invention.

Referring next to FIG. 3, the embodiments of the teachings of the invention are illustrated. Similar structure disclosed in FIG. 1 and described with reference to this illustration have been similarly numbered. In this embodiment the storage target member 15 and mesh screen 17 will be operated in the manner similar to conventional image orthicon operation with the target potential of approximately 400 volts as shown by dotted line 32 in FIG. 2. The input electrical correlation signal is coupled to a grid control member 36 disposed anteriorly to and parallel with photocathode 10 so as to modulate the photoemission current proceeding to the target 15. The variable voltage supply 37 designated $V_c$ merely indicates the application of a variable potential between the photocathode and the grid control electrode 36 while voltage biasing supplies 38 and 39 indicate that the target mesh screen 17 as well as anode member 16 are maintained at a fixed positive biasing voltage. This operation mode will be referred to as the intermediate mode.

Figure 6:
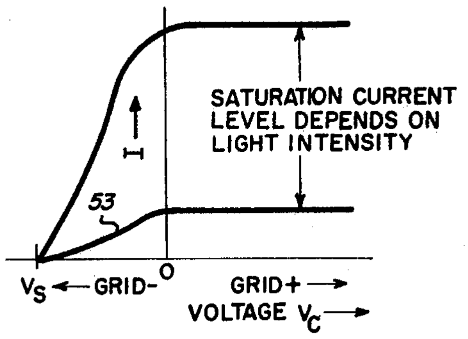
FIG. 6 is a diagrammatic plot of transmitted photoelectric current related to grid control member voltage.

FIG. 6 shows the effect of the voltage $V_c$ in controlling the photoelectric current. The photoelectrons leaving the photocathode are thus controlled by the signal No. 2 input and a relatively small modulating signal is required to produce full modulation of the photoelectrons reaching the target member as shown by curve 53. With this additional structure the grid control electrode affords a means for operation of the image orthicon device in a manner now to be described to provide for cancellation of the accumulated target bias or background charge which has heretofore hindered the resolution and sensitivity parameters in electro-optical correlation with normal image orthicon voltages employed.

Figure 4:
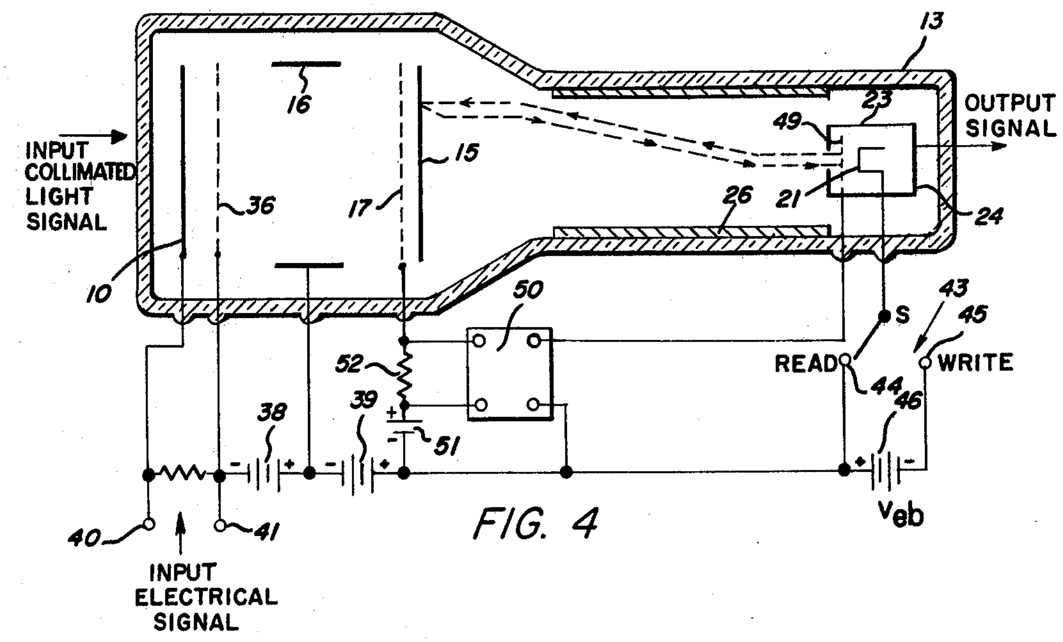
FIG. 4 is a circuit diagram for erasing the positive charge accumulated from uncorrelated signals by means of coupling from the target mesh screen to erase beam control grid voltage.
Figure 5:
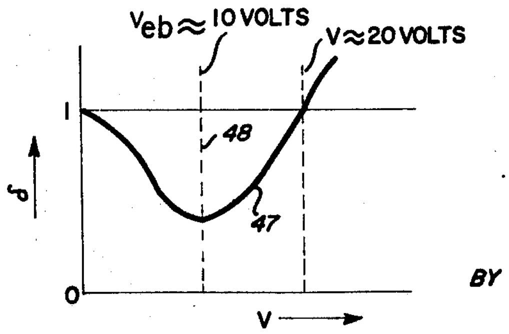
FIG. 5 is an illustrative plot of the operating regime of the erasing function of the invention.

In connection with FIG. 4, a circuit incorporating cancelling of the target background charge will now be explained. The control grid member 36 is coupled to the input electrical signal by means of terminals 40 and 41. In view of the teachings of the invention for the provision of the operation of the readout gun during the writing operation an adjustment of the beam current and beam energy is required to provide that an accumulation of *negative* charge is placed on the reading side of the target at *substantially the same rate* as the accumulation of *positive* background charge occurs during the writing. It is desirable to operate the cathode gun assembly 21 in the two conditions designated by the terminals of switch 43 as the read terminal 44 and write terminal 45. A voltage supply 46 indicated by the letters $V_{eb}$ is required to bias the cathode slightly more negatively during the erase or write mode than the potential during the readout mode which effectively establishes the initial target potential. To illustrate the region in which operation of the desired low erasing beam voltage relative to the target is desired reference is directed to FIG. 5 showing the lower or flat part of secondary emission characteristic curve 31 in FIG. 2 somewhat enlarged and designated by the numeral 47. By keeping the erasing beam voltage relative to the target secondary emission characteristic curve 47 the secondary emission ratio is substantially independent of beam voltage and the target will be charged negatively by the erasing beam. The desired point of operation is designated by the dotted line 48 and the voltage supply 46 will bias the cathode of reading gun 21 to achieve this value.

During operation of the circuit for the cancellation of the accumulated target bias or DC background charge the erasing beam current must also be adjusted to balance the major part of the target charging current produced on the writing side of the target 15 by the photoelectrons. A suggested circuit for accomplishing this will result in the target mesh screen 17 being tied to the gun control grid 49 through a low pass filter and buffer amplifier 50. A biasing voltage supply 51 and resistor 52 are also coupled in this circuit to the target grid mesh screen and during the switching between the read and write modes the low pass filter and amplifier will permit the DC background cancellation to operate without being affected by the correlation signals which will be at a higher frequency.

Other circuits will suggest themselves to those skilled in the art including the use of the integrated output signal during the read mode to establish the erase gun control grid bias for the succeeding writing operation. In all practicing embodiments it will be evident that by using the technique of continuously erasing the DC target background signal the full utilization of the dynamic range of the image orthicon tube may be realized for use in the cross correlation signal processing.

It will be obvious to those skilled in the art that any number of circuit configurations may be substituted to accomplish the purposes set forth herein. The important feature to bear in mind is that with the disclosed invention it is now permissible to integrate optically modulated input signals using cross correlation techniques with the high resolution outputs realized by existing television camera tubes. The coupling of one of the correlation signals to a grid control member disposed adjacent to the photocathode of the television camera tube provides the means for accomplishing the higher sensitivities in the target member of the image orthicon tube. While a detailed illustrative embodiment has been shown and described herein, it is intended that this description be considered as exemplary only and not in a limiting sense in the interpretation of the broader aspects of the invention.

What is claimed is:

1. An image orthicon electron discharge device comprising:

an evacuated envelope;

means defining an electron image section disposed adjacent to one end of said envelope;

means defining an electron signal multiplier and integrating section disposed within the remainder of said envelope;

said electron image section including a photocathode having a photosensitized surface for converting incident radiant energy rays into emitted photoelectrons disposed at one end;

a charge storage target member disposed at the opposing end of said section and having a surface coating having a secondary electron emission ratio greater than unity;

means for focusing said photoelectrons emitted from said photocathode onto said target member surface; and a conductive grid control member disposed between said focusing means and said photocathode.

2. An image orthicon electron discharge device according to claim 1 and means for impressing electrical biasing signals on said grid control member to modulate the photoemission current within the electron image section.

3. An electro-optical integrator device comprising:

an evacuated envelope;

a photocathode having a photosensitized surface for emitting photoelectrons upon incidence of light signals disposed at one end of said envelope and converting said signals into an electron discharge image;

means for electronically multiplying and integrating said electron image signals including a charge storage target member havng a surface coating adapted to emit secondary electrons upon impingement by photoelectrons;

means for focusing said emitted photoelectrons onto said target member;

means for generating an electron scanning beam directed on the reverse side of said storage target member to vary the potential of the charge stored thereon in accordance with the light intensity pattern of the converted electron image signals;

a conductive grid control member disposed between said focusing means and said photocathode;

means biasing said grid control member for modulating the photoemission current in the region between said photocathode and storage target member; and means coupled to said scanning beam generation means for collecting and transmitting the multiplied and integrated electron image signals.

4. A system for electro-optical correlation of information signals comprising:

a source of radiant energy rays;

means for collimating and directing said rays in a beam to traverse an optical delay line modulator;

said modulator including means for introducing a first electrical energy signal in a solid state delay line to ultrasonically modulate the emergent signal beam pattern;

photoelectric conversion means for detecting and integrating said emergent beam signals comprising:

an evacuated envelope;

a photocathode adapted to emit photoelectrons;

a charge storage target member spaced from said photocathode and adapted to emit secondary electrons;

means for focusing said emitted photoelectrons onto said target member;

a conductive grid control member disposed between said focusing means and said photocathode;

means biasing said grid control member by a second electrical energy signal to thereby modulate the photoemission current impinging on said storage target member; and means for electronically scanning the reverse side of said storage target member to integrate the product of said modulated electrical signals and deriving a correlated electrical input signal.

5. In an image orthicon electron discharge device having an electron image section and an electron scanning section:

said electron image section including a photocathode for emitting photoelectrons upon illumination by a light source and a charge storage target member for emitting secondary electrons upon incidence of photoelectrons;

means for focusing said photoelectrons for impingement on said target member;

said target member accumulating a positive polarity charge in the electron image response to the brighter areas of the illuminating source;

a mesh screen member biased at near ground potential disposed adjacent to and parallel with said target member;

a grid control member disposed between said focusing means and said photocathode;

means biasing said grid control member for modulating by electrical input signals the photoemission current in the electron image section;

said electron scanning section including means generating a readout electron beam directed to the reverse side of the target member to neutralize the positively charged regions and derive a variable electrical output signal representative of the illuminating source; and means for operating said readout beam generation means whereby an accumulation of negative charges is placed on the scanned side of the target member at substantially the same rate as the positive charge accumulation of the photocathode side of the target member.

6. In combination:

an image orthicon electron discharge device having within an evacuated envelope in the order named a photocathode, a grid control member, a mesh screen member, a charge storage target member and means generating an electron beam for scanning the reverse side of said target member;

circuit means for erasing accumulated positively charged areas from said target member comprising:

means biasing said grid control member by an input modulating electrical signal;

switch means providing two designated terminal means connected to the scanning beam generation means;

voltage biasing supply means serially connected between said terminals to bias said beam generation means slightly more negative in one terminal position relative to the other; and means for adjusting the beam current and energy during operation in one terminal position including an electrically connected low pass filter and buffer amplifier disposed between the beam control grid and said mesh screen member.

References Cited

UNITED STATES PATENTS

| | | | |
|---|---|---|---|
| 2,999,184 | 9/1961 | Hansen | 315—10 |
| 3,111,666 | 11/1963 | Wilmotte. | |
| 3,193,721 | 7/1965 | Nakayama et al. | 315—10 |
| 3,295,010 | 12/1966 | Clayton | 315—11 |
| 3,349,231 | 10/1967 | Harmon | 324—77 X |

RODNEY D. BENNETT, Jr., Primary Examiner

J. P. MORRIS, Assistant Examiner

U.S. Cl. X.R.

324—77

PO-1050
(5/69)

UNITED STATES PATENT OFFICE
CERTIFICATE OF CORRECTION

Patent No. 3,474,286 Dated October 21, 1969

Inventor(s) Rudolf C. Hergenrother

It is certified that error appears in the above-identified patent and that said Letters Patent are hereby corrected as shown below:

Please amend patent as follows:
Column 1, line 68, after the word "may", insert --then-
Column 7, line 71, delete "input" and insert --output--

SIGNED AND
SEALED
DEC 22 1970

(SEAL)
Attest:

Edward M. Fletcher, Jr.
Attesting Officer

WILLIAM E. SCHUYLER, JR.
Commissioner of Patents